Figure 1:
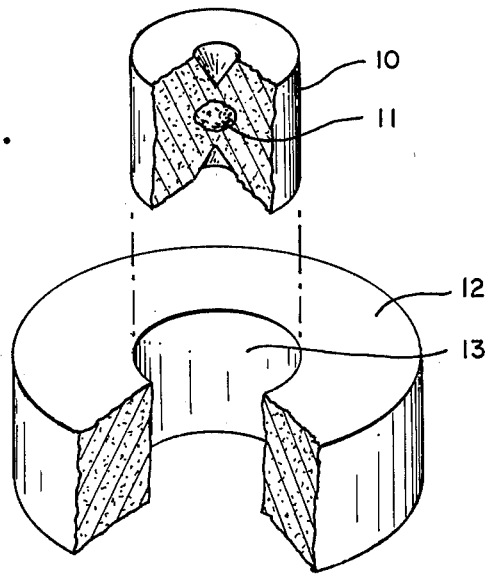

United States Patent [19]

Foley

[11] 4,078,456
[45] Mar. 14, 1978

[54] DIAMOND WIRE DRAWING DIE BLANKS AND METHODS OF MAKING THE SAME

[75] Inventor: Edward M. Foley, Russiaville, Ind.

[73] Assignee: Cabot Corporation, Kokomo, Ind.

[21] Appl. No.: 781,532

[22] Filed: Mar. 28, 1977

[51] Int. Cl.² ............................. B21K 5/20; B22F 7/08
[52] U.S. Cl. .................................. 76/107 A; 228/131; 75/208 R; 428/552
[58] Field of Search ............. 76/107 A, 107 R, 101 B, 76/DIG. 12; 228/131; 428/552; 75/208 R

[56] References Cited

U.S. PATENT DOCUMENTS

| | | | |
|---|---|---|---|
| 1,944,758 | 1/1934 | Roux | 75/208 R |
| 2,689,641 | 9/1954 | Lips et al. | 76/107 A |
| 2,866,364 | 12/1958 | Bieberich | 76/107 A |
| 2,913,819 | 11/1959 | Andreotti et al. | 75/208 P |
| 3,831,428 | 8/1974 | Wentorf, Jr. | 76/107 A |
| 3,978,744 | 9/1976 | Zachman | 76/107 A |

Primary Examiner—Harold D. Whitehead
Assistant Examiner—Roscoe V. Parker
Attorney, Agent, or Firm—Jack Schuman; Joseph J. Phillips

[57] ABSTRACT

A wire drawing die blank and method of producing the same is provided in which the blank is made by:

a. forming a compact of a superalloy powder containing a diamond and having an outside diameter smaller than the diameter of the drawing apparatus die aperture in which it is to be used, b. pressing a ring of powdered stainless steel having an inner annular opening adapted to receive the sintered superalloy compact containing a diamond and an outer diameter adapted to fit a drawing die apparatus aperture in which it is to be used, said powdered stainless steel having a shrinkage coefficient on sintering sufficient to cause the ring to shrink onto and tightly engage said compact, and c. sintering the stainless steel at a temperature below the melting point of the compact to consolidate and shrink the stainless steel onto the compact and to metallurgically bond the stainless steel and the superalloy of the compact.

15 Claims, 2 Drawing Figures

U.S. Patent    March 14, 1978    4,078,456

DIAMOND WIRE DRAWING DIE BLANKS AND METHODS OF MAKING THE SAME

This invention relates to diamond wire drawing die blanks and methods of making the same and particularly to a diamond wire drawing die produced as a sintered powdered metal compact of lower cost than diamond wire drawing dies of the past.

The use of diamonds supported by a metal or carbide backing or shroud for wire drawing is not new. Diamonds have, for example, been embedded in a cast iron shroud and set in a mounting of 18-8 nichromium steel (U.S. Pat. No. 2,689,641), in a forged metal shroud of aluminum, bronze or monel (U.S. Pat. No. 2,866,364) in a metal bonded carbide jacket (U.S. Pat. No. 3,831,428) as well as in other mechanical ways. Unfortunately, the methods of these patents have resulted in a relatively high rate of diamond loss through breakage and off-center placement during forming of the die. Part of these losses are due to the fact that the die is not under uniform spherical radial compression design to offset in part the outward compression of the wire being drawn so that the diamond lacks adequate support. In addition, part of the losses are due to the diamond being forced off center during the shrouding or backing operation so that on drilling the diamond, the hole is off center.

In order to overcome these problems, Zachman proposed in U.S. Pat. No. 3,978,744, a diamond wire drawing die blank having a diamond centered on the axis of a metal powder shroud consolidated to substantially full density and having at least one external cavity. The die blank of Zachman is made by metering approximately one half of a metal powder required to form a shroud around a diamond in a die cavity, partially compressing said one half while forming a central conical depression in said powder, placing a diamond in the formed conical depression, adding the remaining metal powder to the mold over the diamond and first partially compressed half, compressing the metal powder around the diamond and sintering said metal powder compact. This powder metal used in this practice must be a superalloy powder such as *Stellite Alloys No. 3, No. 6, No. 589, No. 208, No. 19 or the like if a high strength die is desired. Such metal powders are very expensive and as a result high strength dies of the full diameter of the drawing apparatus die aperture, usually 1" inch or more, are very expensive because of the cost of the superalloy necessary to produce such large die bodies.
*Trademark of Cabot Corporation I have discovered that diamond wire drawing dies of equal strength to those made completely of superalloy powder according to Zachman can be produced by first forming a small sintered diamond wire drawing blank compact having a diameter of about one-third that of the final blank or about ⅜ to ½ inch of superalloy powder according to the teaching of Zachman, forming a pressed powdered metal stainless steel outer ring having an inner diameter substantially that of the formed inner compact so that the inner compact will slip fit within the inner annulus of the stainless steel ring and an outer diameter sufficient to fit the aperture of the drawing die, sintering the powdered stainless steel ring at a temperature below the melting temperature of the superalloy compact to consolidate the stainless steel ring and to cause the stainless steel ring to shrink into tight contact with the superalloy compact and to create a metallurgical bond by molecular diffusion between the stainless steel ring and the superalloy compact. The stainless steel powder must have a shrinkage coefficient sufficient on sintering to close any gap between the compact and the inner diameter wall of the pressed stainless steel ring. This generally requires a shrinkage coefficient of more than 1% and preferably about 3%.

Figure 2:
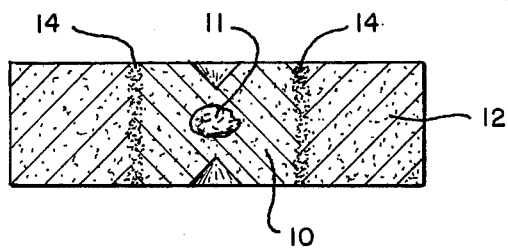

In the foregoing general description I have set out certain objects, purposes and advantages of the present invention. Other objects, purposes and advantages of this invention will be apparent however from a consideration of the following description and the accompanying drawings in which:

FIG. 1 is an exploded view of the sintered compact containing a diamond prepared according to Zachman and a pressed powder stainless steel ring for receiving the same prior to sintering the powdered stainless steel; and FIG. 2 is a section through a completed die blank of this invention.

Referring to the drawings I have illustrated a compact 10 of *Stellite Alloy No. 6 compacted and sintered about a diamond 11 as described in Zachman U.S. Pat. 3,978,744. The compact 10 is, however, only ⅜ inch in diameter whereas the desired die blank is 1⅛ inches in diameter. A ring 12 of 304 stainless steel powder was pressed with a center opening 13 of ⅜ inch diameter and an outer diameter of 1⅛+ inches and a thickness greater than that of compact 10 by an amount equal to the shrinkage coefficient of the stainless steel powder (3% in the case of this example). The center opening 13 and the outer diameter of the compact 10 were arranged so that opening 13 was about one thousandth of an inch larger than the compact 10 so that the compact 10 would press into opening 13 easily. The compact 10 was placed in opening 13 of pressed stainless steel powder ring 12 and the stainless steel was sintered at 2120° F. until the stainless steel approached its maximum density and shrinkage. The die blank was then tested for strength by having the compact 10 pushed out of ring 12. The load required to accomplish this was 39,675 lbs. There was considerable deformation of the stainless steel and the superalloy compact had fractured around the corners when breakage occurred. There was a clear metallurgical bond 14 between the stainless steel ring 12 and the compact 10 at their contact interfaces resulting apparently from a diffusion between the two alloys.

The same practice was repeated using 316 stainless steel powder with similar results. The load required to push out the center in this case was 22,800 lbs. Again the stainless steel was deformed prior to the compact breaking free and the corners of compact 10 were broken.

In both cases the load required to push out the die compact 10 was far in excess of any load which such a die would be required to handle in practice. Such dies of this invention can be produced at a fraction of the cost of dies produced by Zachman using all superalloy powder.

In the foregoing specification I have set out certain preferred practices and embodiments of my invention, however, it will be understood that this invention may be otherwise embodied within the scope of the following claims.

I claim:

1. The method of forming wire drawing die blanks comprising the steps of:

a. forming a compact of a superalloy powder containing a diamond and having an outside diameter smaller than the diameter of the drawing apparatus die aperture in which it is to be used by:
  (1) metering substantially one half of a metal powder required to form said compact into a die cavity for receiving powder metal;
  (2) partially compressing said substantially one half of the metal powder into a flat member of substantially uniform thickness in said die cavity;
  (3) forming a central conical shaped depression in the top surface of said compacted powder metal;
  (4) placing a diamond in said conical depression without removing the compacted powder metal from said die cavity;
  (5) adding the remaining metal powder required to form a compact into said die cavity over the diamond and said partially compressed one half without removing the compacted powder metal from said die cavity;
  (6) compressing said remaining metal powder and said substantially one half of metal powder around said diamond in said die cavity; and
  (7) sintering said metal powder compact;
b. pressing a ring of powdered stainless steel having an inner annular opening adapted to receive the sintered superalloy compact containing a diamond and an outer diameter adapted to fit a drawing die apparatus aperture in which it is to be used, said powdered stainless steel having a shrinkage coefficient on sintering sufficient to cause the ring to shrink onto and tightly engage said compact, and
c. sintering the stainless steel at a temperature below the melting point of the compact to consolidate and shrink the stainless steel onto the compact and to metallurgically bond the stainless steel and the superalloy of the compact.

2. A method as claimed in claim 1 wherein the compact has an outside diameter of about ⅜ to ½ inch.

3. A method as claimed in claim 1 wherein the pressed stainless steel ring has a shrinkage coefficient of greater than about 1%.

4. A method as claimed in claim 1 wherein the stainless steel ring has a shrinkage coefficient of about 3%.

5. A method as claimed in claim 1 wherein the stainless steel powder is 304 stainless steel and the superalloy is Stellite Alloy No. 6.

6. A method as claimed in claim 1 wherein the stainless steel is 316 stainless steel and the superalloy is Stellite Alloy No. 6.

7. A method as claimed in claim 1 wherein at least one external axial conical depression is formed in the final compressed superalloy compact.

8. A method as claimed in claim 1 wherein an external conical axial depression is formed at each end of the superalloy compact during final compression.

9. A method as claimed in claim 1 wherein the superalloy metal powder is an alloy selected from the group consisting of Stellite Alloys No. 6, No. 3, No. 589, No. 208 and No. 19.

10. A diamond wire drawing die blank comprising an inner compact formed of sintered superalloy powder having a diamond centered on the axis thereof and an outer stainless steel ring of stainless steel powder applied around the sintered superalloy powder compact and sintered thereon to shrink said stainless steel ring onto the superalloy compact.

11. A diamond wire drawing die blank as claimed in claim 10 wherein the sintered superalloy compact has an outside diameter approximately one-third of the final blank.

12. A diamond wire drawing die blank as claimed in claim 10 wherein the sintered superalloy compact has an outside diameter in the range about ⅜ to ½ inch.

13. A diamond wire drawing die blank as claimed in claim 10 wherein the superalloy compact is made from an alloy selected from the group consisting of Stellite Alloys No. 3, No. 6, No. 589, No. 208 and No. 19.

14. A diamond wire drawing die blank as claimed in claim 10 wherein the superalloy blank and stainless steel ring are metallurgically bonded together.

15. A diamond wire drawing die blank as claimed in claim 14 wherein the metallurgical bond is a diffusion bond.

* * * * *